US011961362B2

(12) United States Patent
Huke et al.

(10) Patent No.: US 11,961,362 B2
(45) Date of Patent: Apr. 16, 2024

(54) SYSTEM AND METHOD FOR DETERMINING EFFECTIVENESS OF INCENTIVES IN A WAGERING SYSTEM

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/533,387

(22) Filed: Nov. 23, 2021

(65) Prior Publication Data

US 2022/0165127 A1 May 26, 2022

Related U.S. Application Data

(60) Provisional application No. 63/117,032, filed on Nov. 23, 2020.

(51) Int. Cl.
*G07F 17/32* (2006.01)

(52) U.S. Cl.
CPC ...... *G07F 17/3237* (2013.01); *G07F 17/3288* (2013.01)

(58) Field of Classification Search
CPC ............. G07F 17/3244; G07F 17/3288; G07F 17/3239; G07F 17/323; G07F 17/326; G07F 17/3255; G07F 17/3241; G07F 17/3248; G06Q 30/0207; H04L 67/306
See application file for complete search history.

(56) References Cited

U.S. PATENT DOCUMENTS

2003/0211889 A1* 11/2003 Walker ................ G07F 17/3255 463/42
2004/0077408 A1* 4/2004 D'Amico ............ G07F 17/3267 463/42
2006/0040730 A1* 2/2006 Walker ................ G07F 17/3244 463/20
2007/0087810 A1* 4/2007 Walker .................... A63F 13/00 463/16
2009/0069074 A1 3/2009 Silvestro
2009/0070081 A1 3/2009 Saenz et al.
2009/0275399 A1 11/2009 Kelly et al.
2012/0238353 A1 9/2012 Herrmann et al.
2013/0225263 A1* 8/2013 Thompson .......... G07F 17/3267 463/31
2017/0278121 A1* 9/2017 Duplan ................... H04L 9/088
2018/0174179 A1* 6/2018 Kohli ..................... G06Q 20/36
2018/0268652 A1* 9/2018 Crittenden .......... G07F 17/3255

OTHER PUBLICATIONS

International Search Report and Written Opinion dated Feb. 16, 2022, in connection with corresponding International Patent Application No. PCT/US2021/060549; 11 pages.

* cited by examiner

*Primary Examiner* — Justin L Myhr
(74) *Attorney, Agent, or Firm* — Maier & Maier, PLLC

(57) ABSTRACT

This invention provides a method of determining appropriate incentives to users of a wagering platform or application by tailoring the incentive to the type of user that they are and provides incentives to increase the user's engagement with the platform or application to modify the user's behavior to allow them to become more experienced users.

20 Claims, 3 Drawing Sheets

Figure 1:
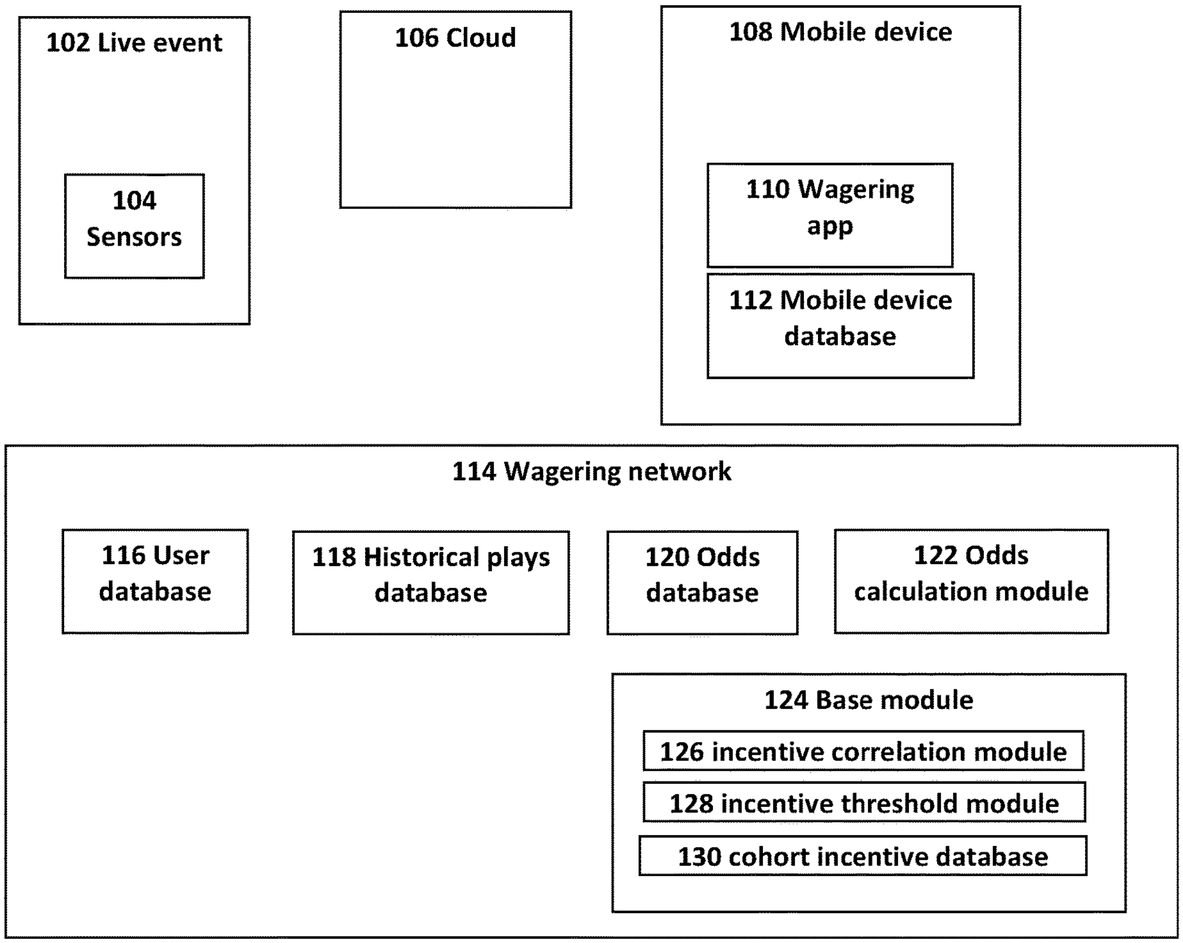

| Cohort | Incentive | | Behavior Threshold | Correlation Coefficient |
|---|---|---|---|---|
| | Incentive | Requirement | | |
| 3 | One Night Stay at Ceasars Palace | Increase Average Amount Wagered by $1,000 for 3 months | If user wagers $1,000 for 1 month | 0.97 |
| 3 | Two Tickets to Las Vegas Raiders Game | Increase Average Number of Wagers Placed by 300 for 8 weeks | If user placed 100 wagers a week for 3 weeks | 0.88 |
| - | - | - | - | - |
| 2 | $100 Credit | Increase Average Amount Wagered by $100 for 1 month | If user wagers $50 a week for 2 weeks | 0.91 |
| 2 | 10 Free $5 wagers | Increase Average Number of Wagers Placed by 25 for 4 weeks | If user placed 20 wagers for 2 weeks | 0.89 |
| - | - | - | - | - |
| 1 | $10 Credit | Increase Average Amount Wagered by $10 for 2 weeks | If user wagered $10 for 1 week | 0.85 |
| 1 | $5 wager Credit | Increase Average Number of Wagers Placed by 5 for 1 week | If user placed 1 wager a day for 7 days | 0.83 |
| - | - | - | - | - |
| - | - | - | - | - |
| - | - | - | - | - |

130

Cohort Incentive Database

Base Module

Incentive Correlation Module

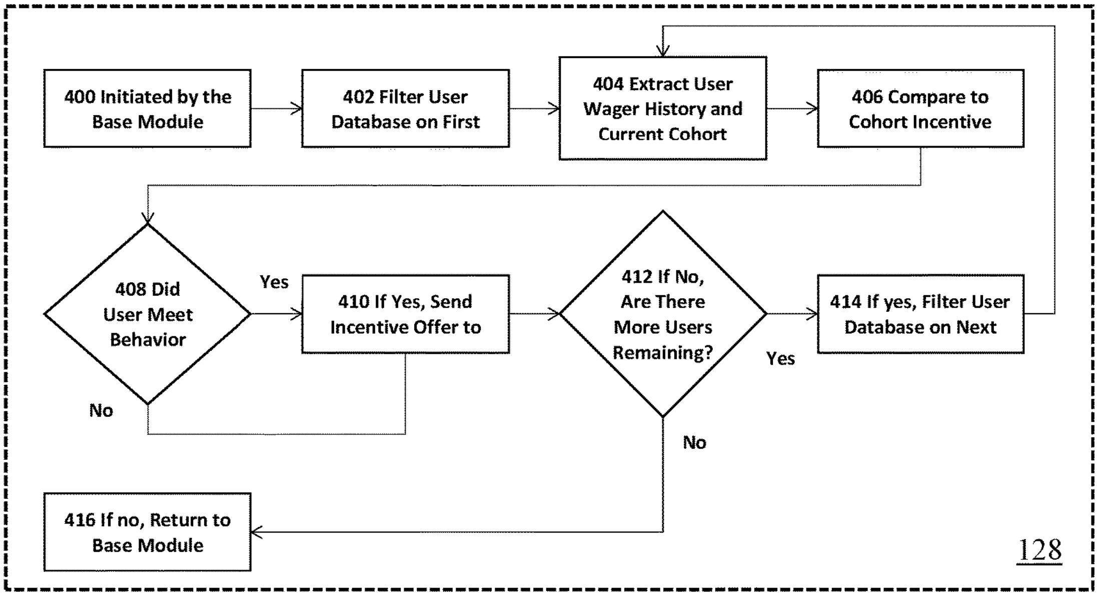

Incentive Threshold Module
Fig. 4

| Cohort | Incentive | | Behavior Threshold | Correlation Coefficient |
|---|---|---|---|---|
| | Incentive | Requirement | | |
| 3 | One Night Stay at Ceasars Palace | Increase Average Amount Wagered by $1,000 for 3 months | If user wagers $1,000 for 1 month | 0.97 |
| 3 | Two Tickets to Las Vegas Raiders Game | Increase Average Number of Wagers Placed by 300 for 8 weeks | If user placed 100 wagers a week for 3 weeks | 0.88 |
| - | - | - | - | - |
| 2 | $100 Credit | Increase Average Amount Wagered by $100 for 1 month | If user wagers $50 a week for 2 weeks | 0.91 |
| 2 | 10 Free $5 wagers | Increase Average Number of Wagers Placed by 25 for 4 weeks | If user placed 20 wagers for 2 weeks | 0.89 |
| - | - | - | - | - |
| 1 | $10 Credit | Increase Average Amount Wagered by $10 for 2 weeks | If user wagered $10 for 1 week | 0.85 |
| 1 | $5 wager Credit | Increase Average Number of Wagers Placed by 5 for 1 week | If user placed 1 wager a day for 7 days | 0.83 |
| - | - | - | - | - |
| - | - | - | - | - |
| - | - | - | - | - |

130

Cohort Incentive Database
Fig. 5

SYSTEM AND METHOD FOR DETERMINING EFFECTIVENESS OF INCENTIVES IN A WAGERING SYSTEM

FIELD

The embodiments are generally related to play-by-play wagering on live sporting events.

BACKGROUND

An issue with wagering applications and platforms is that they provide generic incentives to increase user engagement, most of which are not tailored to the user's behavior.

Also, most wagering applications provide incentives for signing up for the application but do not provide many other incentive options to increase user engagement.

Lastly, wagering applications offer big incentives such as large sums of money or expensive trips, but these incentives are more focused on expert users who already have high engagement with the application, and there are limited options, along with limited chances to win the casual or beginner users.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for increasing user engagement by offering incentives to incrementally modify user behavior, according to an embodiment.

Figure 2:
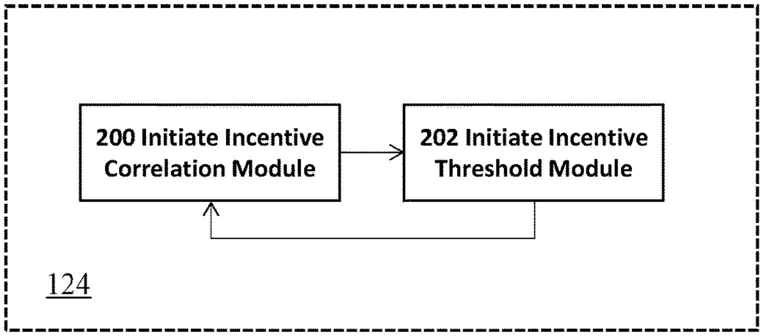

FIG. 2: illustrates a base module, according to an embodiment.

Figure 3:
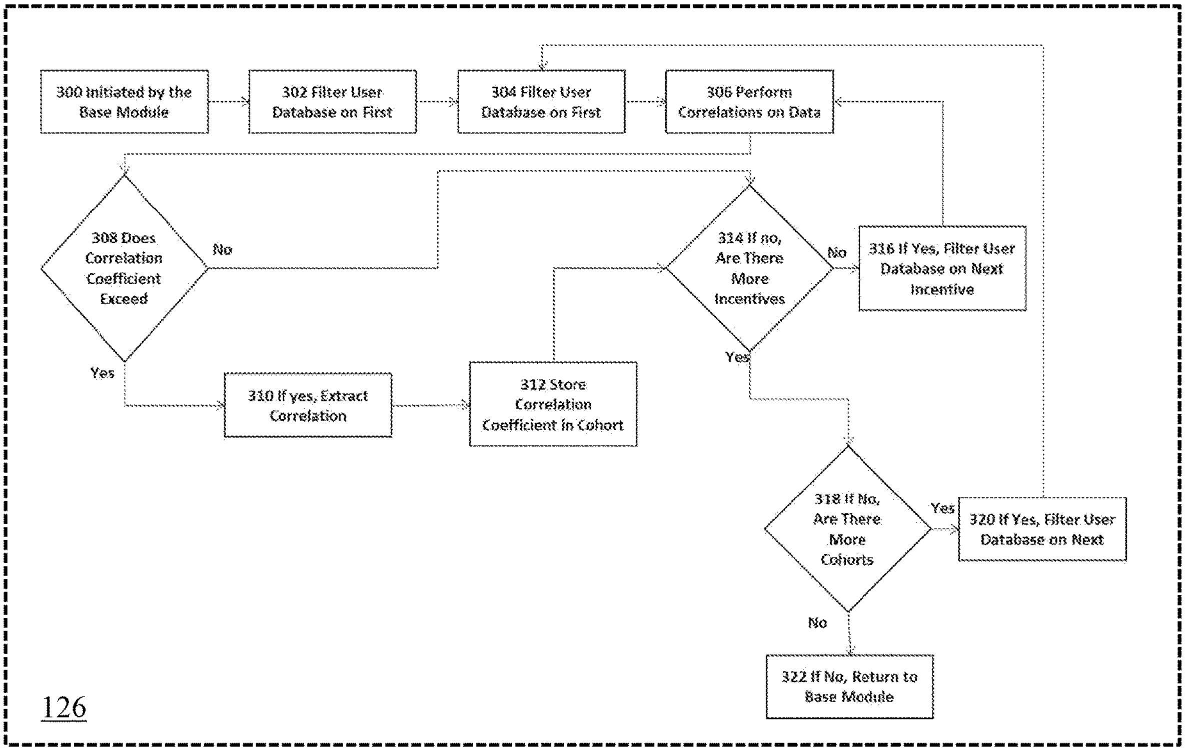

FIG. 3: illustrates an incentive correlation module, according to an embodiment.

FIG. 4: illustrates an incentive threshold module, according to an embodiment.

FIG. 5: illustrates a cohort incentive database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for increasing user engagement by offering incentives to incrementally modify user behavior. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle which limit the amount of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and may be compared with a variety of team data and league data based on a variety of elements, including the current down, possession, score, time, team, and so forth, as described in various exemplary embodiments herein. The wagering network 114 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a base module 124, which initiates an incentive correlation module 126, which determines the appropriate incentives that should be offered to the users and initiates an incentive threshold module 128, which determines if the user's wagering history behavior results in being offered an incentive and incentive requirements that the user would need to reach to receive the incentive.

Further, embodiments may include the incentive correlation module 126, which filters the user database 116 on the first cohort. Then the incentive correlation module 126 filters the user database 116 on the first incentive. The incentive correlation module 126 determines relationships between items by performing correlations on the filtered data. For example, the user database 116 is filtered on the cohort, and one of the incentives, such as $100 credit or one-night stay at a hotel and casino, such as Caesars Palace®, and a relation is determined by correlations performed on the rest of the parameters with the selected parameter that has filtered the database, such as length of time since the user has been offered the incentive against the user's wagering history. An example of correlated parameters is with the time since the user being offered a one-night stay at Caesars Palace® vs. the number of wagers placed by the user with a 0.97 correlation coefficient, and this correlation is extracted and stored in a Cohort Incentive Database 130 with the cohort, such as cohort three, and the incentive, such as one night stay in Caesars Palace®. Another example, the user database 116 is filtered on the cohort and one of the incentives, such as $100 credit. An example of correlated parameters is with the time since the user was offered the incentive of a $100 credit vs. the number of wagers placed by the user with a 0.91 correlation coefficient, and this relationship and correlation is extracted and stored in the Cohort Incentive Database 130 with the cohort, such as cohort two, and the incentive, such as the $100 credit. An additional example may be, the user database 116 is filtered on the cohort and one of the incentives, such as a $10 credit. An example of correlated parameters is the amount of time since the user was offered the $10 credit incentive vs. the number of wagers placed by the user with a 0.85 correlation coefficient, and this correlation is extracted and stored in the cohort incentive database 130. These examples provide the wagering network with incentives that increase user engagement to achieve the offered incentive. For example, if the user is offered one night at Caesars Palace®, the correlation coefficient of 0.97 shows that the user has increased the number of wagers placed within a certain time to receive the offered incentive. Then the incentive correlation module 126 extracts the correlation coefficient from the correlations that were performed and stores the correlation coefficient, the incentive, and the cohort in the Cohort Incentive Database 130. If it is determined that more incentives are remaining in the user database 116, the incentive correlation module 126 filters the user database 116 on the next incentive, and the process returns performing correlations. If it is determined that there are no more incentives remaining in the user database 116, the incentive correlation module 126 determines if more cohorts are remaining in the user database 116. If it is determined that more cohorts are remaining in the user database 116, the incentive correlation module 126 filters the user database 116 on the next cohort and returns filtering the user database 116 on the incentives. If it is determined that there are no more cohorts remaining, the incentive correlation module 126 returns to the base module 124.

Further, embodiments may include the incentive threshold module 128, which filters the user database 116 on the first user. Then the incentive threshold module 128 extracts the user wager history and current cohort from the user database 116. The incentive threshold module 128 then compares the user wager history to the cohort incentive database 130 behavior threshold. Then the incentive threshold module 128 determines if the user meets any of the behavior thresholds. For example, if the user's cohort is cohort one and the user has wagered $10 for one week, the user will be offered an incentive for a $10 credit if the user increases the average amount wagered by $10 for two weeks. Another example would be if the user is in cohort two and if the user reaches the behavior threshold of wagering $50 a week for two weeks, then the user will be offered an incentive of $100 credit if the user increases the average amount wagered by $100 for one month. If it is determined that the user did meet the behavior threshold, the incentive threshold module 128 sends the incentive to the user. If it is determined that the user did not meet the threshold requirements, the incentive threshold module determines if more users are remaining in the user database 116. If it is determined that more users are remaining in the user database 116, the incentive threshold module 128 filters the user database 116 on the next user, and the process returns extracting the user's wagering history. If it is determined that there are no more users remaining in the user database 116, the incentive threshold module 128 returns to the base module 124.

Further, embodiments may include a cohort incentive database 130, which contains the cohort, such as 3 for expert, 2 for casual, 1 for a beginner. It may also contain the incentives that have been associated with each cohort, such as what the incentive is and the requirement to secure the incentive, the behavior threshold, and the correlation coefficient. For example, the cohort incentive database 130 contains the correlation coefficient from the process described in the incentive correlation module 126 to determine if the incentive provided increases user engagement. For example, the incentive is correlated with increasing the wagers placed or the amount wagered over a certain time after collecting the incentive. The behavior threshold is used in the process described in the incentive threshold module 128 to determine if the user's previous wagering pattern matches the behavior to be offered the chance to win the incentive, in which the user needs to meet incentive requirements to receive the incentive.

FIG. 2 illustrates the base module 124. The process begins with the base module 124 initiating, at step 200, the incentive correlation module 126. In an exemplary embodiment, the base module 124 is always running. In one embodiment, the base module may be prompted by hew data in the user database 116. The incentive correlation module 126 filters the user database 116 on the first cohort. Then the incentive correlation module 126 filters the user database 116 on the first incentive. The incentive correlation module 126 determines relationships by performing correlations on the filtered data. For example, the user database 116 is filtered on the cohort, and one of the incentives, such as $100 credit or one-night stay at Caesars Palace®, and then a relationship is determined by correlations that are performed on the rest of the parameters with the selected parameter that has filtered the database, such as length of time since the user has been offered the incentive against the user's wagering history. An example of correlated parameters is the time since the user being offered a one-night stay at Caesars Palace® vs. the number of wagers placed by the user with a 0.97 correlation coefficient, this correlation is extracted and stored in the Cohort incentive database 130 with the cohort, such as cohort 3, and the incentive, such as one night stay in Caesars Palace®. Another example, the user database 116 is filtered on the cohort and one of the incentives, such as $100 credit. An example of correlated parameters is with the time since the user was offered the incentive of a $100 credit vs. the number of wagers placed by the user with a 0.91 correlation coefficient, and this correlation is extracted and stored in the Cohort incentive database 130 with the cohort, such as 2, and the incentive, such as the $100 credit. An additional example may be, the user database 116 is filtered on the cohort and one of the incentives, such as a $10 credit. An example of correlated parameters is the amount of time since the user was offered the $10 credit incentive vs. the number of wagers placed by the user with a 0.85 correlation coefficient, this correlation is extracted and stored in the Cohort incentive database 130. These examples provide the wagering network with incentives that increase user engagement to achieve the offered incentive. For example, if the user is offered one night at Caesars Palace®, the correlation coefficient of 0.97 shows that the user has increased the number of wagers placed within a certain time to receive the offered incentive. Then the incentive correlation module 126 extracts the correlation coefficient from the relationships that were determined by correlations that were performed and stores the correlation coefficient, the incentive, and the cohort in the Cohort incentive database 130. If it is determined that more incentives are remaining in the user database 116, the incentive correlation module 126 filters the user database 116 on the next incentive, and the process returns performing correlations to determine relationships. If it is determined that there are no more incentives remaining in the user database 116, the incentive correlation module 126 determines if more cohorts are remaining in the user database 116. If it is determined that more cohorts are remaining in the user database 116, the incentive correlation module 126 filters the user database 116 on the next cohort and returns filtering the user database 116 on the incentives. If it is determined that there are no more cohorts remaining, the incentive correlation module 126 returns to the base module 124. Then the base module 124 initiates, at step 202, the incentive threshold module 128. For example, the incentive threshold module 128 filters the user database 116 on the first user. Then the incentive threshold module 128 extracts the user wager history and current cohort from the user database 116. The incentive threshold module 128 then compares the user wager history to the cohort incentive database 130 behavior threshold. Then the incentive threshold module 128 determines if the user meets any of the behavior thresholds. For example, if the user's cohort is cohort one and the user has wagered $10 for one week, the user will be offered an incentive for a $10 credit if the user increases the average amount wagered by $10 for two weeks. Another example would be if the user is in cohort two and if the user reaches the behavior threshold of wagering $50 a week for two weeks, then the user will be offered an incentive of $100 credit if the user increases the average amount wagered by $100 for one month. If it is determined that the user did meet the behavior threshold, the incentive threshold module 128 sends the incentive to the user. If it is determined that the user did not meet the threshold requirements, the incentive threshold module determines if more users are remaining in the user database 116. If it is determined that more users are remaining in the user database 116, the incentive threshold module 128 filters the user database 116 on the next user, and the process returns extracting the user's wagering history. If it is determined that there are no more users remaining in the user database 116, the incentive threshold module 128 returns to the base module 124.

FIG. 3 illustrates the incentive correlation module 126. The process begins with the base module 124 initiating, at step 300, the incentive correlation module 126. The incentive correlation module 126 filters, at step 302, the user database 116 on the first cohort. For example, the user database 116 may contain the user's cohort, such as cohort 1 for a beginner user, cohort 2 for a casual gambler, and cohort 3 for an expert gambler, the incentives previously offered to the user, such as a $100 credit or one night stay at Caesars Palace®, the date in which the incentive was offered, and the user's wagering history. Then the incentive correlation module 126 filters, at step 304, the user database 116 on the first incentive. For example, the incentive correlation module 126 filters the database on the first incentive, such as $100 credit or a one-night stay at Caesars Palace®. The incentive correlation module 126 performs, at step 306, a relationship determination via performing correlations on the filtered data. For example, the user database 116 is filtered on the cohort, and one of the incentives, such as $100 credit or one-night stay at Caesars Palace® and then relationships are determined by correlations that are performed on the rest of the parameters with the selected parameter that has filtered the database, such as length of time since the user has been offered the incentive against the user's wagering history. An example of correlated parameters is the time since the user being offered a one-night stay at Caesars Palace® vs. the number of wagers placed by the user with a 0.97 correlation coefficient, and this correlation is extracted and stored in the Cohort Incentive Database 130 with the cohort, such as cohort three, and the incentive, such as one night stay in Caesars Palace®. In another example, the user database 116 is filtered on the cohort and one of the incentives, such as $100 credit. An example of correlated parameters is the time since the user was offered the incentive of a $100 credit vs. the number of wagers placed by the user with a 0.91 correlation coefficient, and this correlation is extracted and stored in the Cohort Incentive Database 130 with the cohort, such as cohort two, and the incentive, such as the $100 credit. An additional example may be, the user database 116 is filtered on the cohort and one of the incentives, such as a $10 credit. An example of correlated parameters is the amount of time since the user was offered the $10 credit incentive vs. the number of wagers placed by the user with a 0.85 correlation coefficient, and this correlation is extracted and stored in the Cohort Incentive Database 130. These examples provide the wagering network 114 with incentives that increase user engagement to achieve the offered incentive. For example, if the user is offered one night at Caesars Palace®, the correlation coefficient of 0.97 shows that the user has increased the number of wagers placed within a certain time to receive the offered incentive. The incentive correlation module 126 determines, at step 308, if the correlation coefficient exceeds a predetermined threshold. For example, if the correlation coefficient is above a 0.75 correlation coefficient threshold, that would determine if the incentive provided to the user increased the user's engagement and the incentive provided the desired effect to increase the user's wagering habits. If the correlation coefficient is below the threshold, that may result in the incentive not providing the necessary reaction from users to increase engagement, and the incentive would not be provided to users. If it is determined that the correlation coefficient exceeded the predetermined threshold, then the incentive correlation module 126 extracts, at step 310, the correlation coefficient from the correlations that were performed. For example, if the two correlated parameters are the time since the user being offered a one-night stay at Caesars Palace® and the number of wagers placed by the user with a 0.97 correlation coefficient and this correlation is extracted. Then the incentive correlation module 126 stores, at step 312, the correlation coefficient in the Cohort Incentive Database 130. For example, the incentive correlation module 126 stores the correlation coefficient of 0.97. If it is determined that the correlation coefficient is not above the predetermined threshold, the incentive correlation module 126 determines, at step 314, if more incentives are remaining in the user database 116. In some embodiments, the incentive may be removed from the cohort incentive database 130 if the correlation coefficient does not exceed the predetermined threshold. If it is determined that more incentives are remaining in the user database 116, the incentive correlation module 126 filters, at step 316, the user database 116 on the next incentive, and the process returns to step 306. For example, if the user database 116 is filtered for cohort three, the next incentive might be two free tickets to a Las Vegas Raiders Football game. The user database 116 may then be filtered on the next incentive, and correlations are performed. If it is determined that there are no more incentives remaining in the user database 116, the incentive correlation module 126 determines, at step 318, if more cohorts are remaining in the user database 116. For example, if there are no more incentives for cohort three, then the incentive correlation module 126 filters the user database 116 on the next cohort, such as cohort two. If it is determined that more cohorts are remaining in the user database 116, the incentive correlation module 126 filters, at step 320, the user database 116 on the next cohort and returns to step 304. If it is determined that there are no more cohorts remaining, the incentive correlation module 126 returns, at step 322, to the base module 124.

FIG. 4 illustrates the incentive threshold module 128. The process begins with the incentive threshold module 128 being initiated, at step 400, by the base module 124. The incentive threshold module 128 filters, at step 402, the user database 116 on the first user. For example, the incentive threshold module 128 filters the user database 116 on the user ID, such as JS12345. Then the incentive threshold module 128 extracts, at step 404, the user wager history and current cohort from the user database 116. For example, the incentive threshold module 128 extracts all the wagers previously placed by the user. In some embodiments, the extracted wagering history may be for the past hour, day, week, month, year, etc. The incentive threshold module 128 then compares, at step 406, the user wager history to the cohort incentive database 130 behavior threshold. For example, if the user's cohort is cohort one and the user has wagered $10 for one week, the user will be offered an incentive for a $10 credit if the user increases the average amount wagered by $10 for two weeks. Another example would be if the user is in cohort two and if the user reaches the behavior threshold of wagering $50 a week for two weeks, then the user will be offered an incentive of $100 credit if the user increases the average amount wagered by $100 for one month. Then the incentive threshold module 128 determines, at step 408, if the user meets any of the behavior thresholds. For example, if the user's cohort is cohort one and the user has wagered $10 for one week, the user will be offered an incentive for a $10 credit if the user increases the average amount wagered by $10 for two weeks. Another example would be if the user is in cohort two and if the user reaches the behavior threshold of wagering $50 a week for two weeks, then the user will be offered an incentive of $100 credit if the user increases the average amount wagered by $100 for one month. If it is determined that the user did meet the behavior threshold, the incentive threshold module 128 sends, at step 410, the incentive to the user. For example, if the user's cohort is cohort one and the user has wagered $10 for one week, the user will be offered an incentive for a $10 credit if the user increases the average amount wagered by $10 for two weeks. Another example would be if the user is in cohort two and if the user reaches the behavior threshold of wagering $50 a week for two weeks, then the user will be offered an incentive of $100 credit if the user increases the average amount wagered by $100 for one month. If it is determined that the user did not meet the threshold requirements, the incentive threshold module determines, at step 412, if more users are remaining in the user database 116. If it is determined that more users are remaining in the user database 116, the incentive threshold module 128 filters, at step 414, the user database 116 on the next user, and the process returns to step 404. If it is determined that there are no more users remaining in the user database 116, the incentive threshold module 128 returns, at step 416, to the base module 124.

FIG. 5 illustrates the cohort incentive database 130. This figure displays the cohort incentive database 130, which contains the cohort, such as cohort three for expert, cohort two for casual, or cohort one for beginner, the incentives, such as what the incentive is and the requirement to secure the incentive, the behavior threshold, and the correlation coefficient. For example, the cohort incentive database 130 contains the correlation coefficient from the process described in the incentive correlation module 126 to determine if the incentive provided increases user engagement, such as increasing the wagers placed or the amount wagered over a certain time to collect the incentive. The behavior threshold is used in the process described in the incentive threshold module 128 to determine if the user's previous wagering pattern matches the behavior to be offered the chance to win the incentive, in which the user needs to meet incentive requirements to receive the incentive.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for evaluating incentives provided to users of a wagering network, comprising:

selecting, by at least one computer processor, a first of a plurality of incentives stored in a cohort incentive database, identifying, by the at least one computer processor, which of a plurality of users stored in a user database have been offered the first incentive, comparing, by the at least one computer processor, a wager history of each identified user with the first incentive, retaining, by the at least one computer processor, the first incentive in the cohort incentive database when the comparison between the wager history of each identified user and the first incentive shows an increase in user engagement and/or wagering habits, identifying, by the at least one computer processor and for each of the plurality of users stored in the user database, whether the wager history of the user qualifies the user to receive any of the plurality of incentives stored in the cohort incentive database, offering, by the at least one computer processor, to the user a respective one of the plurality of incentives when the wager history of the user qualifies for the respective incentive, and awarding, by the at least one computer processor, the respective incentive when the wager history of the user qualifies the user to receive the respective incentive, wherein comparison of the wager history of each identified user with the first incentive comprises calculation of a correlation coefficient for the first incentive based on the wager history of each identified user, and the correlation coefficient comparing at least a time elapsed since the first incentive was offered to a respective user and a wager activity of the respective user since the first incentive was offered.

2. The method for evaluating incentives provided to users of the wagering network of claim 1, wherein the plurality of incentives stored in the cohort incentive database and the plurality of users stored in the user database are each categorized, by the at least one computer processor, according to a plurality of cohorts, and wherein those of the plurality of users categorized in a first of the plurality of cohorts are only offered those of the plurality of incentives which are categorized in the first cohort.

3. The method for evaluating incentives provided to users of the wagering network of claim 2, wherein the plurality of users are sorted into the plurality of cohorts based on at least one of: an average number of wagers per week, an average value of wagers, or a success rate of wagers.

4. The method for evaluating incentives provided to users of the wagering network of claim 1, wherein identifying whether the wager history of the user qualifies the user to receive any of the plurality of incentives stored in the cohort incentive database considers only the wager history from one of: a past day, a past week, a past month, and a past year.

5. The method for evaluating incentives provided to users of the wagering network of claim 1, wherein, failure of the first incentive to increase user engagement and/or wagering habits results in removal of the first incentive from the cohort incentive database.

6. The method for evaluating incentives provided to users of the wagering network of claim 1, wherein each of the plurality of incentives comprising a user behavior threshold, an incentive requirement, and an incentive reward.

7. The method for evaluating incentives provided to users of the wagering network of claim 6, wherein the incentive requirement comprises a threshold average value of wagers placed in a predetermined time period.

8. The method for evaluating incentives provided to users of the wagering network of claim 6, wherein the incentive requirement comprises a threshold number of wagers placed in a predetermined time period.

9. The method for evaluating incentives provided to users of the wagering network of claim 6, wherein the wager activity of the respective user compared with the first incentive corresponds to the incentive requirement of the first incentive.

10. The method for evaluating incentives provided to users of the wagering network of claim 1, wherein the wager activity of the respective user compared with the first incentive corresponds to a number of wagers placed by the respective user since the first incentive was offered.

11. A system for evaluating incentives provided to users of a wagering network, comprising:

a cohort incentive database which stores a plurality of incentives, a user database which stores a plurality of users, and at least one computer processor, wherein the at least one computer processor is configured to:

select a first of the plurality of incentives;

identify which of the plurality of users have been offered the first incentive;

compare a wager history of each identified user with the first incentive;

retain the first incentive in the cohort incentive database when the comparison between the wager history of each identified user and the first incentive shows an increase in user engagement and/or wagering habits, identify, for each of the plurality of users stored in the user database, whether the wager history of the user qualifies the user to receive any of the plurality of incentives stored in the cohort incentive database;

offer to the user a respective one of the plurality of incentives when the wager history of the user qualifies for the respective incentive; and award the respective incentive when the wager history of the user qualifies the user to receive the respective incentive, wherein comparison of the wager history of each identified user with the first incentive comprises calculation of a correlation coefficient for the first incentive based on the wager history of each identified user, the correlation coefficient comparing at least a time elapsed since the first incentive was offered to a respective user and a wager activity of the respective user since the first incentive was offered.

12. The system for evaluating incentives provided to users of the wagering network of claim 11, wherein the plurality of incentives stored in the cohort incentive database and the plurality of users stored in the user database are each categorized by the at least one computer processor according to a plurality of cohorts, and wherein those of the plurality of users categorized in a first of the plurality of cohorts are only offered those of the plurality of incentives which are categorized in the first cohort.

13. The system for evaluating incentives provided to users of the wagering network of claim 12, wherein the plurality of users are sorted into the plurality of cohorts based on at least one of: an average number of wagers per week, an average value of wagers, or a success rate of wagers.

14. The system for evaluating incentives provided to users of the wagering network of claim 11, wherein identifying whether the wager history of the user qualifies the user to receive any of the plurality of incentives stored in the cohort incentive database considers only the wager history from one of: a past day, a past week, a past month, and a past year.

15. The system for evaluating incentives provided to users of the wagering network of claim 11, wherein, failure of the first incentive to increase user engagement and/or wagering habits results in removal of the first incentive from the cohort incentive database.

16. The system for evaluating incentives provided to users of the wagering network of claim 11, wherein each of the plurality of incentives comprising a user behavior threshold, an incentive requirement, and an incentive reward.

17. The system for evaluating incentives provided to users of the wagering network of claim 16, wherein the incentive requirement comprises a threshold average value of wagers placed in a predetermined time period.

18. The system for evaluating incentives provided to users of the wagering network of claim 16, wherein the incentive requirement comprises a threshold number of wagers placed in a predetermined time period.

19. The system for evaluating incentives provided to users of the wagering network of claim 16, wherein the wager activity of the respective user compared with the first incentive corresponds to the incentive requirement of the first incentive.

20. The system for evaluating incentives provided to users of the wagering network of claim 11, wherein the wager activity of the respective user compared with the first incentive corresponds to a number of wagers placed by the respective user since the first incentive was offered.

* * * * *